T. J. HOLMDEN.
WEEDER.
APPLICATION FILED JUNE 28, 1915.
1,178,015.
Patented Apr. 4, 1916.
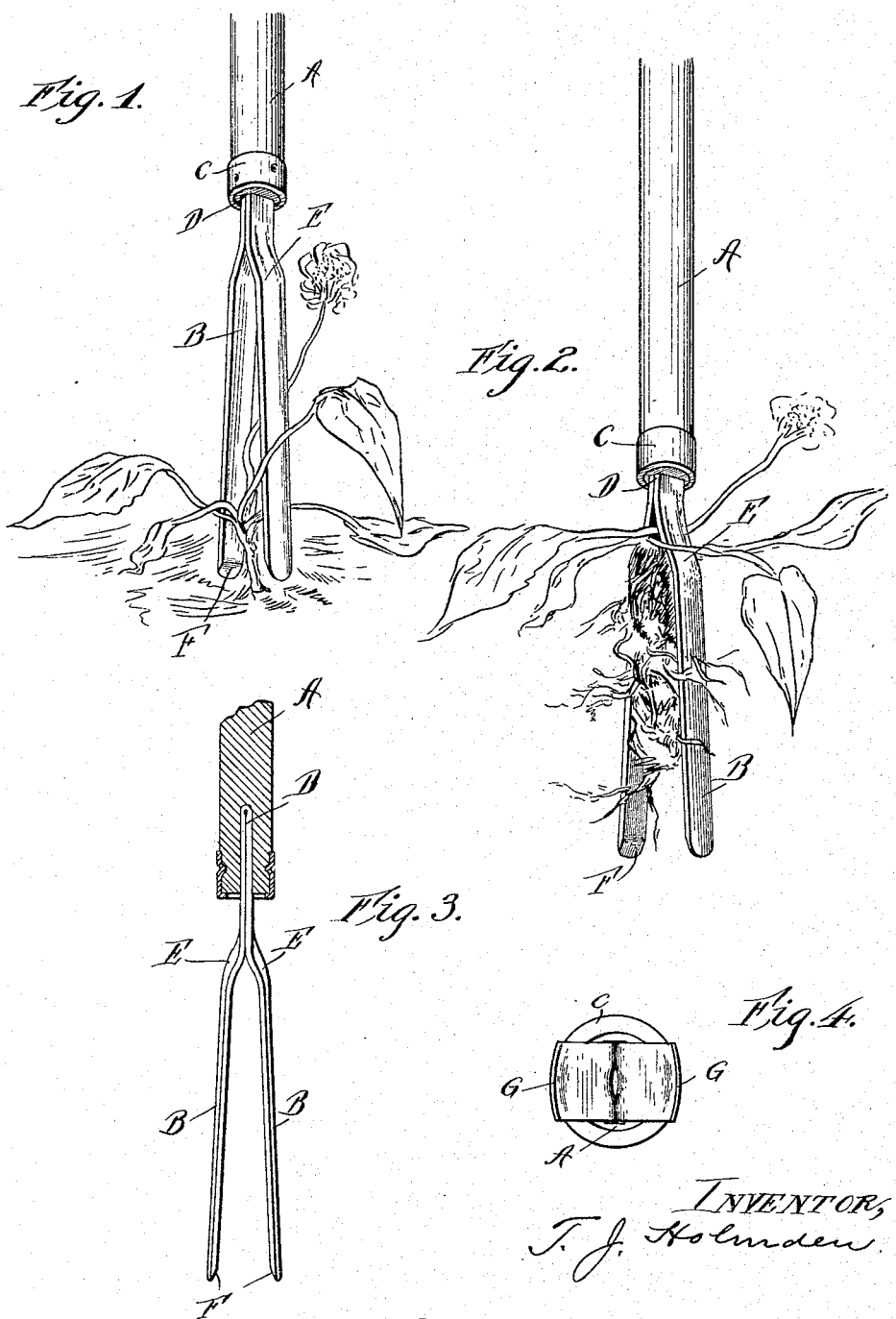

UNITED STATES PATENT OFFICE.

THOMAS J. HOLMDEN, OF LAKEWOOD, OHIO.

WEEDER.

1,178,015.  Specification of Letters Patent.  Patented Apr. 4, 1916.

Application filed June 28, 1915. Serial No. 36,862.

*To all whom it may concern:*

Be it known that I, THOMAS J. HOLMDEN, a citizen of the United States, residing at Lakewood, in the county of Cuyahoga and State of Ohio, have invented a certain new and useful Improvement in Weeders, of which the following is a full, clear, and exact description, reference being had to the accompanying drawings.
This invention relates generally to weeders and more particularly to a device intended for removing small weeds such as plantain and the like from lawns.

The object of the invention is to provide a device which can be quickly and easily operated, one which will remove the weed and roots and a very small quantity of earth, thereby avoiding the digging of holes which is so prevalent with weeding devices employing one blade only.

Another object of the invention is to provide a device which can be operated while the person is in an upright position thereby completely avoiding the back-breaking operation of stooping over.

With these and certain other objects in view the invention consists in the novel features of construction hereinafter fully described and pointed out in the claims.
In the drawings forming a part of this specification Figure 1 is a detail perspective view showing the weeder about to be inserted; Fig. 2 is a similar view showing the weeder inserted and the roots of the weed between the jaws thereof; Fig. 3 is a vertical sectional view; and Fig. 4 is a transverse sectional view.

In carrying out my invention I employ a handle A which is of sufficient length to enable the person operating the device to remain in an upright position, this handle being about the length of the usual cane. The gripping jaws B are inserted in the lower end of this handle A, and secured in place by means of a suitable ferrule C. The jaws B are of steel or other suitable metal, and in practice I prefer to make them from a single piece of stock bent centrally upon itself as shown at D, providing a shank which is the portion inserted in the lower end of the handle, but these jaws may be separate if necessary or desired.

The shank portion of the tool extends a short distance below the end of the handle and then the shank members diverge slightly as indicated at E, providing what may be designated as shoulders, and the jaws B diverge slightly from each other toward their lower ends as most clearly shown in Fig. 3, and the inner edges of these jaws are beveled as indicated at F. Between the shoulder E and the beveled edge F the jaws are slightly curved or convexed longitudinally as shown at G so as to permit the tool to be readily turned after being inserted in the ground, and this construction also serves to facilitate the gripping of the roots and earth between the jaws.

It will be understood that the jaws and shank have considerable elasticity and consequently when the tool is forced down over the weed to be removed the beveled edges F have a tendency to cause the jaws E to separate sufficiently to embrace all of the roots of the weed but at the same time the inherent spring of the shank and jaws prevents said jaws separating too far apart and consequently the minimum amount of earth is taken up with the weed and roots. After the jaws or blades have been inserted in the ground astride the weed and roots, the handle is given a slight turn thereby turning the jaws or blades and completely severing the weed from the ground, and when the jaws or blades are removed, the weed and roots are brought up with it. This weed can be quickly and easily removed from between the jaws and the device is ready for further use.

It will thus be seen that I provide an exceedingly cheap and simple device capable of carrying out all of the objects hereinbefore referred to.

Having thus described my invention, what I claim is:—

1. In a device of the kind described, a handle and a pair of jaws connected thereto, said jaws being substantially parallel but converging slightly toward the handle, the lower ends of said jaws being beveled.

2. In a device of the kind described, a handle and a pair of jaws connected thereto, said jaws having a shank portion and a shoulder portion at the end of said shank portion, the lower ends of said jaws being beveled as set forth.

3. A device of the kind described comprising a handle and a pair of jaws connected thereto, said jaws being substantially parallel, the lower ends thereof being beveled, said jaws being shouldered adjacent the handle.

In testimony whereof, I hereunto affix my signature in the presence of two witnesses.

THOMAS J. HOLMDEN.

Witnesses:
HUGH B. McGILL,
ROBERT L. BRUCK.

Copies of this patent may be obtained for five cents each, by addressing the "Commissioner of Patents, Washington, D. C."